(12) United States Patent
Gerber et al.

(10) Patent No.: US 6,722,488 B2
(45) Date of Patent: Apr. 20, 2004

(54) METHOD AND APPARATUS FOR TRANSFERRING ARTICLES IN UNISON

(75) Inventors: Stephen M. Gerber, Traverse City, MI (US); William F. Mazur, Waterville, OH (US); Larry N. Shue, Woodville, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 10/235,188

(22) Filed: Sep. 4, 2002

(65) Prior Publication Data

US 2004/0050665 A1 Mar. 18, 2004

(51) Int. Cl.[7] .............................................. B65G 47/34
(52) U.S. Cl. ...................................... 198/468.2; 65/260
(58) Field of Search ......................... 198/468.2, 750.11; 65/260

(56) References Cited

U.S. PATENT DOCUMENTS

| 3,095,082 | A | * | 6/1963 | Allgeyer | .................. 198/468.2 |
| 4,494,973 | A | | 1/1985 | Perry | |
| 5,429,651 | A | * | 7/1995 | Bolin | .......................... 65/260 |
| 5,895,513 | A | | 4/1999 | Ciriello et al. | |
| 5,904,745 | A | | 5/1999 | Nafziger et al. | |
| 6,076,654 | A | | 6/2000 | Leidy | |
| 6,241,448 | B1 | | 6/2001 | Nicholas | |

* cited by examiner

*Primary Examiner*—Joseph E. Valenza

(57) ABSTRACT

A takeout device (10) for transferring one or more, usually a plurality, of freshly-formed glass containers (C) from molds (18) of a section of an I.S. machine to a deadplate (20) of the machine. The takeout device has an oscillatable arm (12) that carries a head (14) from which a tong (16) for each of the containers is suspended. Oscillation of the arm is powered by a reversible, linearly-acting electrical motor (24), preferably an a.c. servo motor, that causes a rack (28) to reciprocate. The rack drives an oscillatable gear (34) that oscillatingly drives the arm. The motor is mounted at the top of a post (30) at an elevation above the elevations of the molds and the deadplate, and the motor, therefore, is readily accessible for maintenance and adjustment.

11 Claims, 4 Drawing Sheets

METHOD AND APPARATUS FOR TRANSFERRING ARTICLES IN UNISON

FIELD OF THE INVENTION

This invention relates to a method of, and an apparatus for, transferring, in unison, a plurality of like articles from a first location to a second location. More particularly, this invention relates to a method and apparatus of the foregoing character for transferring a plurality of like, freshly-formed glass containers from opened molds of a glass container forming machine of the I.S. type to a deadplate of the machine for cooling of the containers.

BACKGROUND OF THE INVENTION

As it is explained, for example, in commonly-assigned U.S. Pat. No. 6,076,654 (Leidy) and U.S. Pat. No. 6,241,448 B1 (Nicholas), the disclosure of each of which is incorporated by reference herein, or as is otherwise known, most glass containers are manufactured by a machine type known as an individual section (I.S.) machine. Containers are manufactured by an I.S. machine at one or another of a multitude of machine sections, typically, 6, 8, 10, or even 12 sections, and typically 2 or 3 or 4 containers simultaneously at each section depending on container size and desired production rates. As a final step in the manufacture of containers on an I.S. machine, blown containers are transferred, in unison, from opened blow molds of the machine section in which they were formed to a nearby deadplate of the machine to permit the blown containers to partly cool before the containers are transferred to a removal conveyor for further processing.

Containers are transferred from an I.S. machine section blow mold station to a deadplate by a takeout mechanism that employs a multitude of individual takeout tongs. The takeout tongs for each I.S. machine section are suspended from a head that is suspended from an oscillating arm, one such tong for each container to be transferred from the machine section. After grasping of the containers by the takeout tongs, the arm of the takeout mechanism from which the containers are suspended is turned by approximately 180°, while the containers remain suspended from the tongs, to position the containers over the I.S. deadplate. The takeout heads then release the containers to remain on the deadplate, and the arm of the mechanism is then reverted by 180° to begin a repeat of its operating cycle when the next set of glass containers manufactured at the machine section is ready to be transferred.

Heretofore, oscillating motion of the takeout mechanism head-carrying arm was powered by a fluid prime mover, usually a pneumatic cylinder, that was used to impart reciprocating motion to a toothed rack. The rack engaged a rotatable gear attached to the takeout mechanism so that reciprocating motion of the rack as a result of extension or retraction of the pneumatic cylinder resulted in oscillating motion of the gear and the arm to which it was secured. A parallel linkage connection between the arm and the takeout heads carried by it was employed to maintain the heads suspended from the arm in vertical positions at all arcuate positions of the arm, as is explained, for example, in U.S. Pat. No. 5,271,757 (Houben et al.). Typically, the pneumatic cylinder for such a takeout mechanism was positioned within the frame of the I.S. machine where access for maintenance and adjustment is difficult.

The use of pneumatic cylinders to power operation of a glass container takeout mechanism involves certain problems, certain of which are inherent in the use of pneumatic cylinders for a wide variety of motions, and certain of which are specific to the transfer of freshly-formed glass containers. To begin with, pneumatic prime movers tend to be noisy and their use in a relatively confined space requires close attention to regulatory noise standards. Further, freshly-formed glass containers are still somewhat hot, and are, therefore, soft and subject to dimensional distortion if transferred other than by gentle, low inertia motions, which are difficult to achieve with a pneumatic-powered mechanism unless the mechanism is operated slowly, with gentle starting and stopping actions. This characteristic limits the obtainable cycle times to times that may unduly limit the productive capacity of an I.S. forming machine.

SUMMARY OF THE INVENTION

To overcome the aforesaid and other problems associated with the use of a fluid powered motor to actuate motion of a takeout arm at a section of an I.S. glass container forming machine, there is provided a takeout arm that is powered by a reversible electric motor, preferably a linearly-acting a.c. servo motor that is preferably positioned above the main frame of the I.S. machine for ready access for maintenance and adjustments. Such a motor may be precisely controlled for proper starting and stopping motions to avoid the imposition of excessively large inertia forces on the freshly-formed glass containers that are being transferred, and without unduly lengthening the container transfer cycle time. The reversible motor of the present invention is preferably mounted at the top of a non-extensible or extensible vertical post. In that regard, an extensible vertical post permits the elevation of the container-grasping heads above the forming machine molds and the deadplate to be adjusted to accommodate the processing of containers of various heights. This function may also be achieved with a non-extensible support post by the use of shims of different thicknesses to change the spacing between the tong-supporting heads and the takeout arm from which they are suspended.

Accordingly, it is an object of the present invention to provide an improved method of and apparatus for transferring one or more articles from a first location to a second location. More particularly, it is an object of the present invention to provide a method and apparatus of the foregoing character for transferring one or more freshly-formed glass containers from forming molds of a glass container forming machine to a deadplate of the machine without imposing excessive inertial forces thereon and without unduly delaying the transfer time.

For a further understanding of the present invention and the objects thereof, attention is directed to the drawing and the following brief description thereof, to the detailed description of the invention and to the appended claims.

IN THE DRAWING

DETAILED DESCRIPTION OF THE INVENTION

Figure 1:
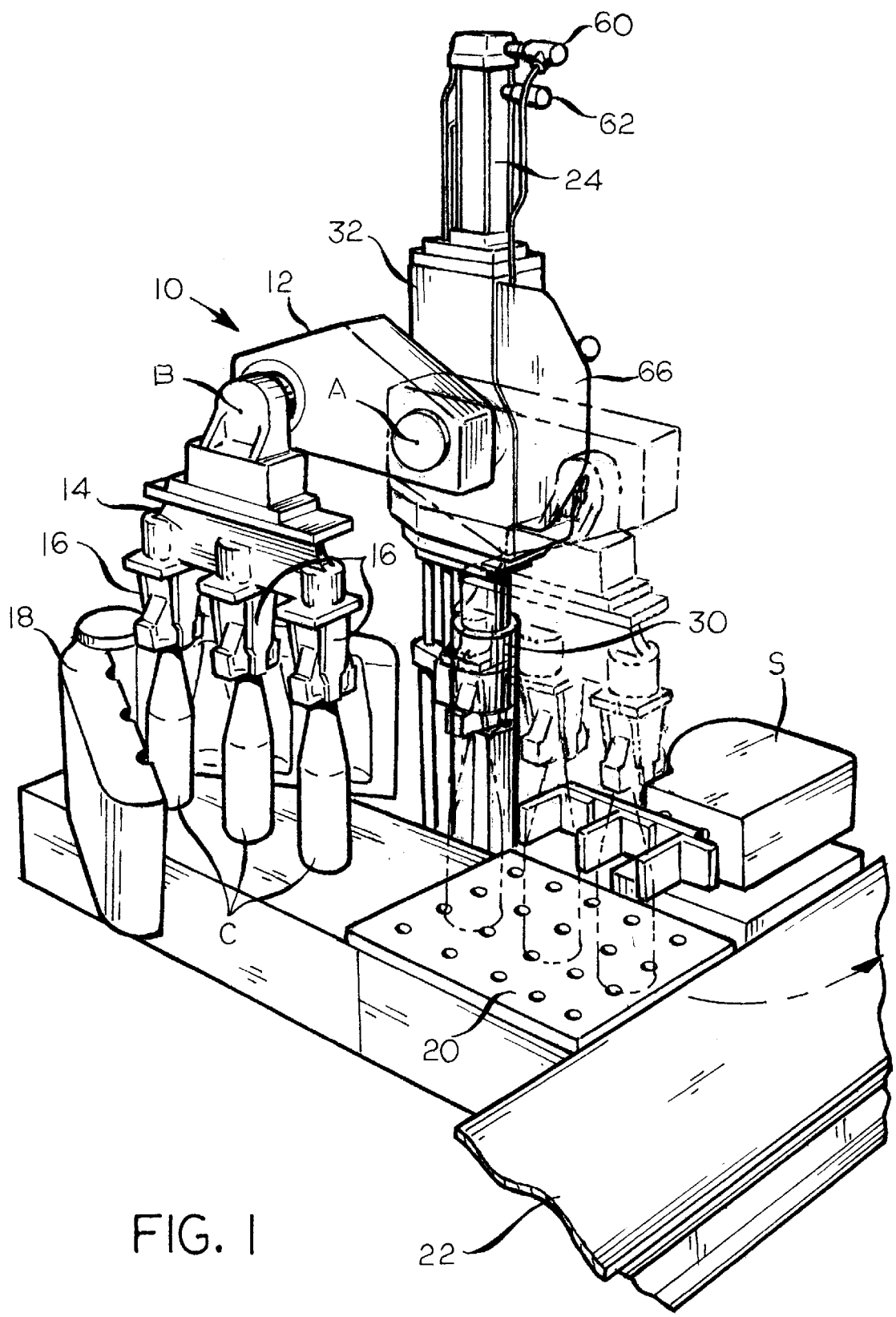
FIG. 1 is a perspective view of a takeout device according to the preferred embodiment of the present invention, in combination with other elements of a glass container forming machine with which it is to be operated.

A takeout device according to the preferred embodiment of the present invention is generally identified by reference numeral 10 in FIG. 1. The takeout device 10 includes an arm 12 from which a head 14 is pivotably suspended. The head 14 has one or more container engaging tongs 16, shown as 3 container engaging tongs, suspended therefrom, 3 such tongs being the appropriate number for use in connection with an I.S. glass container forming machine that is operated by the triple gob process. In that regard, each such tong 16 may be constructed as shown in U.S. Pat. No. 6,241,448 B1 (Nicholas), or in any other known matter. In any case, the tongs 16 are used to grasp containers in a blow mold 18 of an I.S. glass container forming machine, and for then transferring the containers C in unison to a deadplate 20 of the forming machine. As is known, the containers C on the deadplate 20, after partial cooling, are swept to a takeout conveyor 22 for further processing by an oscillatable sweepout device S, which may, for example, operate according to the teachings of commonly-assigned U.S. Pat. No. 5,904,745 (Nafziger et al.), the disclosure of which is incorporated by reference herein, or by the teachings of a patent application to be filed in the name of D. Wayne Leidy et al., now application Ser. No. 10/235,181. In any case, the arm 12 periodically oscillates between the position shown in solid line in FIG. 1, in alignment with the containers C as they are ready to be released from the blow mold 18, to the dotted line position where the containers C are positioned over the deadplate 20, as will be hereinafter described more fully.

Figure 2:
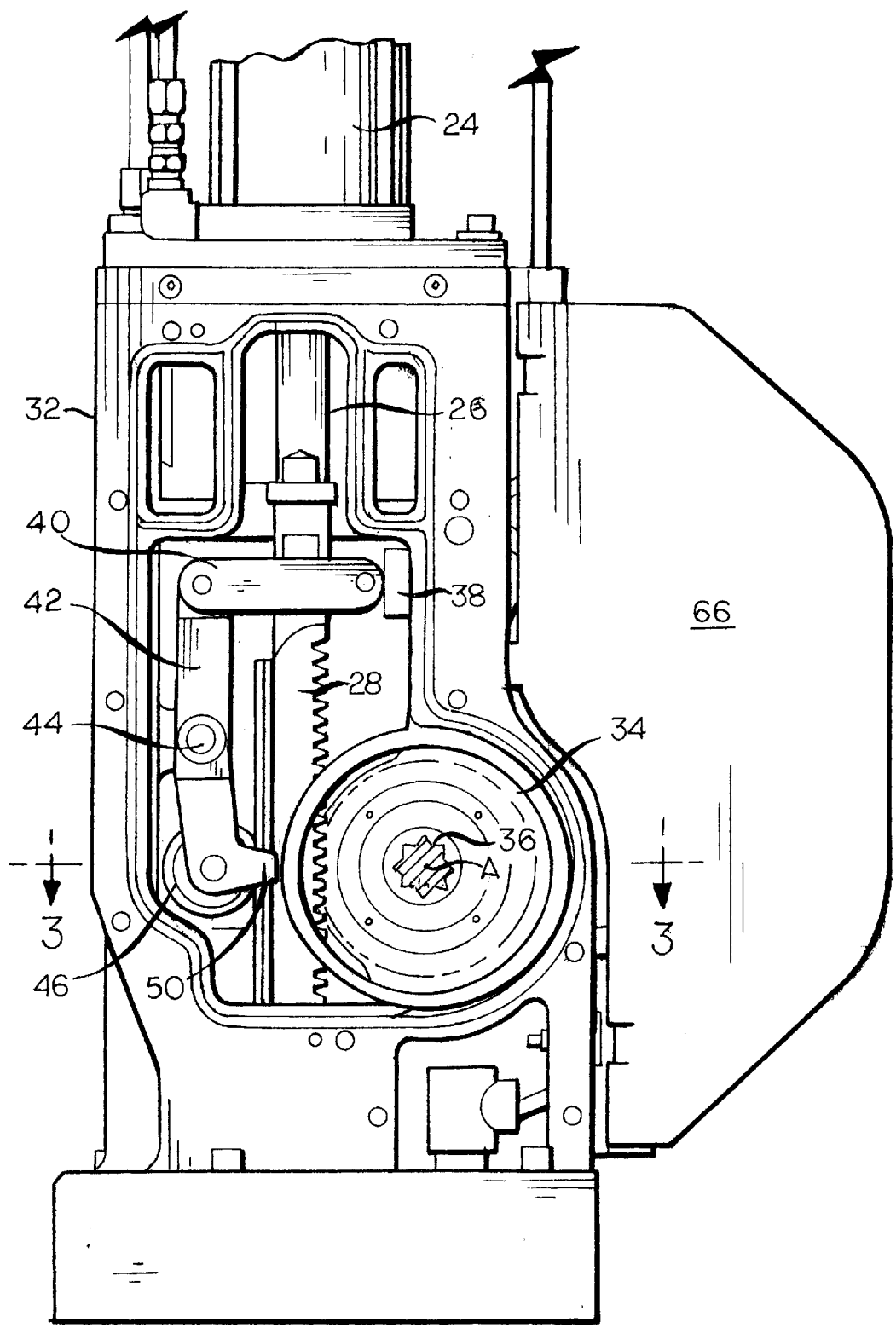
FIG. 2 is an elevation view, at an enlarged scale and with a portion removed, of a portion of the takeout device of FIG. 1.
Figure 3:
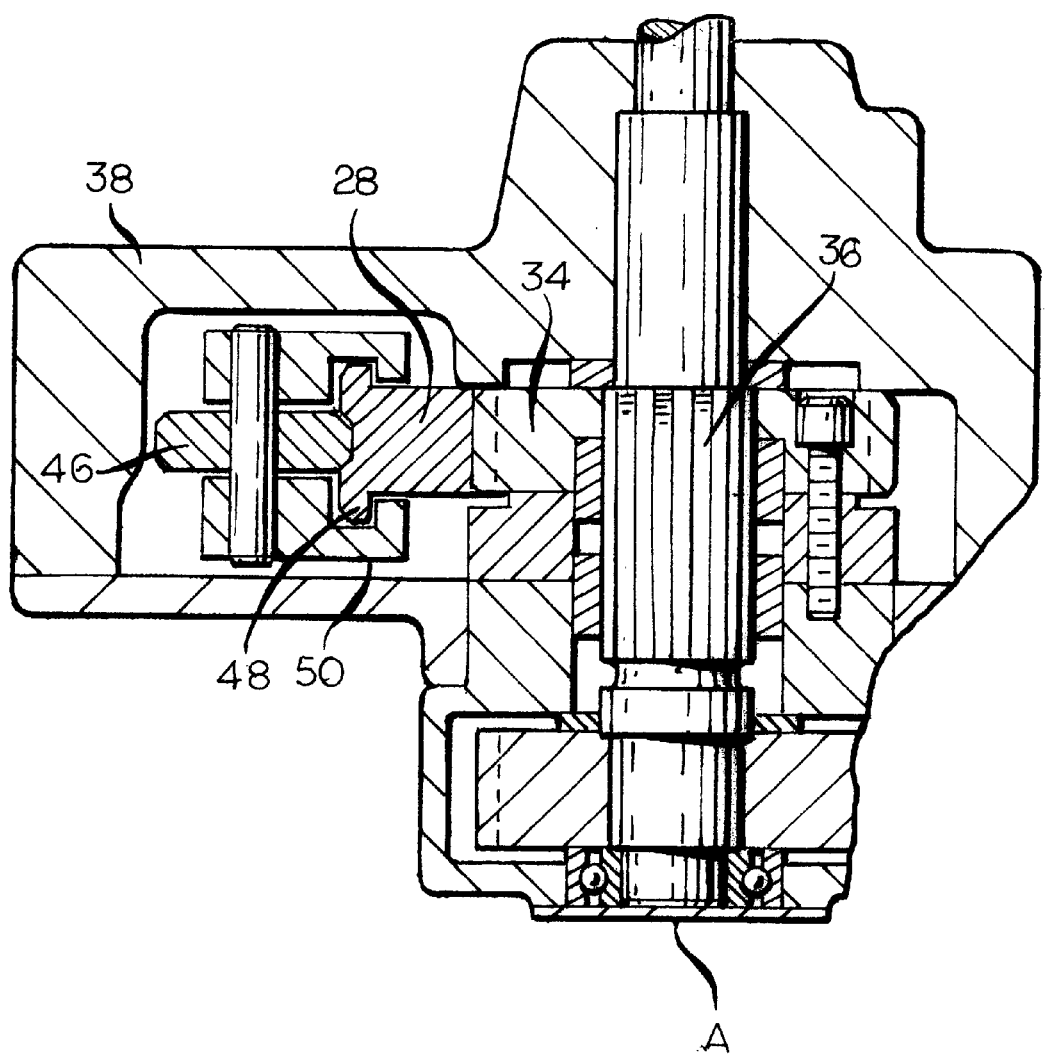
FIG. 3 is a sectional view, at a further enlarged scale, taken on line 3—3 of FIG. 2.

The takeout device 10 also has a vertically extending housing 24 in which a rod 26 is able to reciprocate, the rod 26 having a toothed rack 28 suspended therefrom, as is shown more clearly in FIGS. 2 and 3. The housing 24 is the housing of a reversible, linearly-acting and vertically-extending electrical servo motor, which imparts reciprocating motion to the rod 26 and the rack 28. The housing/motor 24 is supported on a post 30, which may be extensible to permit vertical adjustment of the rest positions of the head 14, or such function can be obtained with a non-extensible post by the use of shims (not shown) to adjust the spacing of the head 14 below the arm 12. In that regard, it is to be noted that the housing/motor 24 is positioned well above the blow mold 18 and the deadplate 20 for easy access for maintenance and adjustment.

Reciprocation of the rack 28 is effective to oscillate a gear 34 about an axis A, to thereby cause oscillation of the arm 12 about the axis A. In that regard, the arm 12 has a parallel motion connection between the axis A and a pivot axis B from which the head 14 is suspended, for example, as taught by commonly-assigned U.S. Pat. No. 4,494,973 (Perry), to ensure that the central axes of the tongs 16 and the containers C that are carried thereby remain vertically oriented during the motion of the arm 12 from the solid line position in FIG. 1 to its broken line position. Further, the axis A is a longitudinal central axis of an oscillating shaft 36 (FIGS. 2 and 3), which is pivotably mounted in a housing 32. A gear 34 is fixed for oscillation with the shaft 36, the shaft 36 having an irregular outer surface and the gear 34 having a complementary irregular inner surface to ensure that the gear 34 and the shaft 36 will oscillate together but not relatively to one another.

To minimize backlash between the rack 28 and the gear 34, and to continuously compensate for any wear occurring in either of them, the rack 28 is continuously resiliently urged against the gear 34 by a compression spring in a housing 38 that acts against a link 40, which is pivoted on each of its ends, the rack 28 being reciprocable relative to the link 40. The link 40, in turn, acts against an end of a lever arm 42 that pivots about a pivot pin 44. A nose portion 50 at an opposed end of the lever arm 42, which is generally C-shaped in cross-section, as shown in FIG. 3, surrounds the rack 28 to continuously permit the rack 28 to reciprocate with respect to the lever arm 34. The lever arm 42 is also provided with a rotatable follower 46 at a location diametrically opposed to the axis A of the gear 34, and the roller 46 rollingly rides against a flange 48 of the rack 28 on the side that is opposed to its toothed side, to thereby permit controlled, low friction contact between the rack 28 and the gear 34 throughout the reciprocation of the rack 28.

Figure 4:
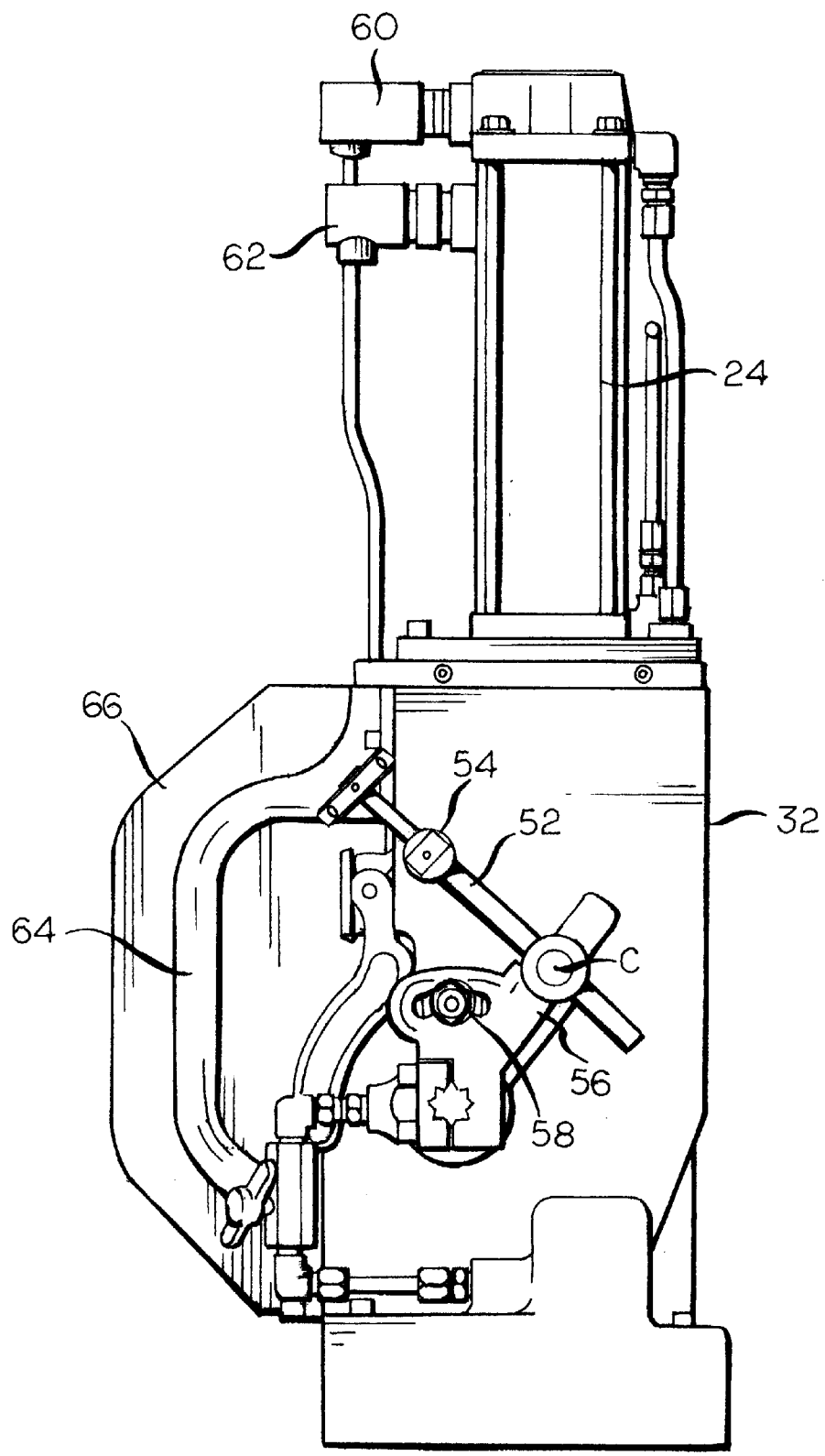
FIG. 4 is a fragmentary elevation view, at an enlarged scale relative to that of FIG. 1, of a portion of the portion of the takeout device that is shown in FIG. 2 from an opposite direction to the direction shown in FIG. 2.

To ensure that the head 14 remains level at all times, the circumferential position of the shaft 36, and thereby the circumferential position of the gear 34, is adjustable by means of an adjustment screw 52 (FIG. 4). The screw 54 is threadably received in a nut 54, and is pivotally attached to an arm 56 at an axis C. The arm 56 is releasably secured to the housing 32 by a fastener 58, which passes through an acurate slot 68 in the arm 56. The arm 56 has an opening that engages the portion of the shaft 36, and when the fastener 58 is released, the arm 56 may be arcurately moved to thereby arcurately reposition the shaft 36 and the gear 34. Of course, adjustment of the circular positions of the shaft 36 and the gear 34 is done with the rack 28 disengaged from the gear 36.

To accurately track the position of the rod 26 within the housing/motor 24, a resolver 60 is attached to an upper end of the housing/motor 24. Further, an electrical supply fitment 62 for the housing/motor 24 is secured thereto, at an elevation below that of the resolver 60. Electrical cables for the resolver 60 and the fitment 62 pass thru the interior of a C-shaped bracket 64 (FIG. 4) that is secured to the housing 32, a shield 66 being secured to the bracket 64 on a side opposed to that on which the adjustment screw 52 is positioned.

Although the best mode contemplated by the inventors for carrying out the invention as of the filing date herein as been shown and described herein, it will be apparent to those skilled in the art that suitable modifications, variations, and equivalents may be made without departing from the scope of the invention, such scope being limited only by the terms of the following claims and legal equivalents thereof.

We claim:

1. Apparatus for transferring a spaced-apart plurality of like articles from a first location to a second location, said apparatus comprising:

an oscillatable arm, said arm being oscillatable through an arc of substantially 180° between a first location and a second location;

a spaced-plurality of tong assemblies carried by the oscillatable arm and oscillatable therewith, each of the tong assemblies being adapted to grasp an article at the first location, to transfer the article to the second location without changing the axial orientation of the article and to release the article at the second location;

a linearly extending rack, said rack having a toothed side and an opposed side and being reciprocable along an axis;

an externally-toothed, oscillatable gear, said oscillatable gear being oscillatable about an axis, being drivingly engaged by said rack, and oscillatingly driving said arm;

a single reversible electrical motor for powering the reciprocation of the rack; and means for resiliently biasing said rack into engagement with said oscillatable gear.

2. Apparatus according to claim 1 wherein said single reversible electrical motor is a linearly-acting, reversible a.c. servo motor.

3. Apparatus according to claim 2 wherein:

said reversible electrical motor is positioned above the first location and the second location.

4. Apparatus according to claim 1 wherein said means for resiliently biasing comprises:

a double-ended link;

resilient biasing means acting on an end of said link;

a double-ended arm, an end of said arm being pivotably attached to an opposed end of said link, said arm being mounted for pivoting motion about an axis between its ends, an opposed end of said arm having a roller in engagement with said opposed side of said rack.

5. Apparatus for transferring a spaced-apart array of freshly-formed glass containers from open molds of a glass container forming machine to an external location, said apparatus comprising:

an oscillatable arm, said arm being oscillatable through an arc of substantially 180° between a first location above the glass containers in the open molds and a second location above the external location;

a spaced-plurality of tong assemblies carried by the oscillatable arm and oscillatable therewith, each of the tong assemblies being adapted to grasp a container at thie first location, to transfer the container to the second location and to release the container at the second location;

a linearly extending rack, said rack having a toothed side and an opposed side and being reciprocable;

an externally-toothed oscillatable gear, said oscillatable gear being oscillatable about an axis, being drivingly engaged by said rack, and oscillatingly driving said arm; and a single reversible electrical motor for powering the reciprocation of the rack; and means for resiliently biasing said rack into engagement with said oscillatable gear.

6. Apparatus according to claim 5 wherein, said reversible electrical motor is a linearly-acting reversible a.c. servo motor.

7. Apparatus according to claim 6 wherein said reversible electrical motor is positioned above the first location and the second location.

8. Apparatus according to claim 5 wherein said means for resiliently biasing comprises:

a double-ended link;

resilient biasing means acting on an end of said link;

a double-ended arm, an end of said arm being pivotably attached to an opposed end of said link, said arm being mounted for pivoting motion about an axis between its ends, an opposed end of said arm having a roller in engagement with said opposed side of said rack.

9. The method of simultaneously transferring a plurality of articles from a first location to a second location, the method comprising:

providing an oscillatable arm;

providing a plurality of article-engaging tongs carried by the oscillatable arm;

providing an oscillatable gear operatively associated with the oscillatable arm;

providing a reciprocable rack in driving engagement with the oscillatable gear;

reversibly electrically powering reciprocation of the rack; and resiliently biasing the rack into engagement with the oscillatable gear.

10. The method according to claim 9 wherein:

the articles to be transferred are freshly-formed glass containers, the first location is a location at open molds of a glass container forming machine, and the second location is a deadplate of the glass containing forming machine.

11. The method according to claim 9 wherein:

the reciprocation of the rack is reversibly electrically powered from a location that is at an elevation above the first location and above the second location.

* * * * *